United States Patent [19]

Cobb et al.

[11] Patent Number: 4,595,922

[45] Date of Patent: Jun. 17, 1986

[54] METHOD AND APPARATUS FOR MONITORING KEYS AND OTHER ARTICLES

[76] Inventors: Richard G. Cobb, 605 S. First, Apt. #1, 68701; S. Keith Chesterton, both of Madison County, Nebr.

[21] Appl. No.: 680,081

[22] Filed: Dec. 10, 1984

[51] Int. Cl.[4] .............................. G06F 7/04; G08B 5/22
[52] U.S. Cl. ........................... 340/825.49; 340/825.11; 340/825.31; 340/568
[58] Field of Search ........... 340/825.06, 825.1, 825.15, 340/825.17, 825.07, 825.49, 825.53, 825.11, 517, 518, 568, 572, 825.31, 825.32; 364/478; 70/456 R, 460

[56] References Cited

U.S. PATENT DOCUMENTS

| | | | |
|---|---|---|---|
| 2,971,806 | 2/1961 | Andreason | 340/825.49 |
| 3,573,739 | 4/1971 | Zeitlin | 340/825.49 |
| 3,958,240 | 5/1976 | Richardson | 340/518 |
| 4,430,717 | 2/1984 | Senda et al. | 364/474 |

Primary Examiner—Donald J. Yusko
Assistant Examiner—Sharon L. Hodgkins
Attorney, Agent, or Firm—Kokjer, Kircher, Bradley, Wharton, Bowman & Johnson

[57] ABSTRACT

A microprocessor based system for storing and monitoring articles such as the keys for the vehicles in the inventory of an automobile dealership. The keys are held on binary coded cards which are received by edge connectors mounted on four removable panels on a wall mounted storage board. Each key has an identification number determined by the code on its card, and each edge connector has a unique address. The microprocessor continuously scans the edge connectors and stores in memory the code of the key at each address. Each edge connector has an indicator light which is turned on when a valid user code is entered on a keyboard and a request is made for the key located at the address of the edge connector. If request is made for a key which is missing, the system displays the number of the key and the user code of the person who removed it.

13 Claims, 5 Drawing Figures

4,595,922

METHOD AND APPARATUS FOR MONITORING KEYS AND OTHER ARTICLES

BACKGROUND AND SUMMARY OF THE INVENTION

This invention relates generally to the monitoring of articles such as the keys for the automobiles in the inventory of automobile dealerships. More particularly, the invention is directed to a system which allows authorized users to easily locate keys and similar articles.

It is not uncommon for automobile delearships to have a large number of both new and used vehicles in stock. Consequently, the dealer is confronted with the difficult problem of keeping track of a large number of keys which must be available to the salesmen, service manager, "lot man" and other authorized personnel. Typically, the keys are hung on a key board when not in use. Each peg on the board is assigned to a particular key which is to be hung on the peg when the salesman or other user who has borrowed it no longer requires use of the key. Another common procedure is to assign a table, drawer or other area for storage of the keys, and the keys that are not in use are simply placed randomly in the storage area.

Both of these systems are unsatisfactory. Salesman and others often fail to return the keys when they are finished with them, and it is difficult for others to locate missing keys because no record is normally kept to identify who has each key. Attempts to provide systems where keys are checked in and checked out by identified personnel have been no more successful, primarily because of failure to follow the proper procedure. In the case of hangboards, even keys which have been returned are sometimes difficult to locate because they are inevitably hung on the incorrect peg from time to time. In the case of surface or drawer storage, it is usually necessary to sort through a large number of keys in order to locate the key that is desired or to determine that it is missing.

Similar problems are encountered in keeping track of keys in other businesses such as the operation of parking lots, office buildings, apartment buildings, real estate companies, and rental car companies. Monitoring the locations of articles other than keys can also present significant difficulty, especially when there are a large number of articles that differ little in appearance.

It is apparent that a need exists for a system which can monitor the locations of keys and other articles and make the articles easily accessible to authorized personnel. It is the primary goal of the present invention to meet that need.

More specifically, it is an object of the invention to provide a method and apparatus for storing articles such as keys and monitoring the locations of the articles while at the same time limiting access to those who are authorized to remove and use the articles. In accordance with the invention, a microprocessor based control system is used in conjunction with a key storage board on which a large number of keys are stored. The keys are held on binary coded cards which fit into slots presented by edge connectors mounted on removable panels that can be detached from the main storage board. The identification codes are printed on the board, and a description of the vehicle associated with each key number is likewise given so that users can easily determine the number of the key that fits the desired vehicle.

The addresses of the edge connectors are continuously scanned by the microprocessor to electronically determined the number of the key located at each address and load the number in memory. Each authorized user must enter on a keyboard his or her assigned user code and then enter the number of a key that is desired. Invalid user codes are rejected and a warning alarm is given. If the user code is valid and the key is present on the board, a lamp adjacent to it is activated to indicate the location of the key. When the key is then removed, the user code and key number are entered in memory and are displayed if a subsequent user requests the same key. This identifies to the subsequent user the person who is in possession of a key which is missing.

All keys returned to the storage board can be applied to any vacant edge connector, and the microprocessor stores in memory the new address of the key. Upon return of a key, it is recognized as being "home", and the user code is cleared from memory. Keys removed in unauthorized fashion result in the generation of a warning alarm. Authorized users are informed that a key locatiaon is unknown if the key has been removed without a valid user code having been entered.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

The present invention provides a key monitoring system which serves to monitor the locations of keys such as the keys for the automobiles in the inventory of an automobile dealer. However, the systems can also monitor the keys that are handled by parking lots, rental car companies, real estate companies, factories, office buildings and other firms which must keep track of a relatively large number of keys. It should also be understood that the system can monitor items other than keys if desired.

Figure 1:
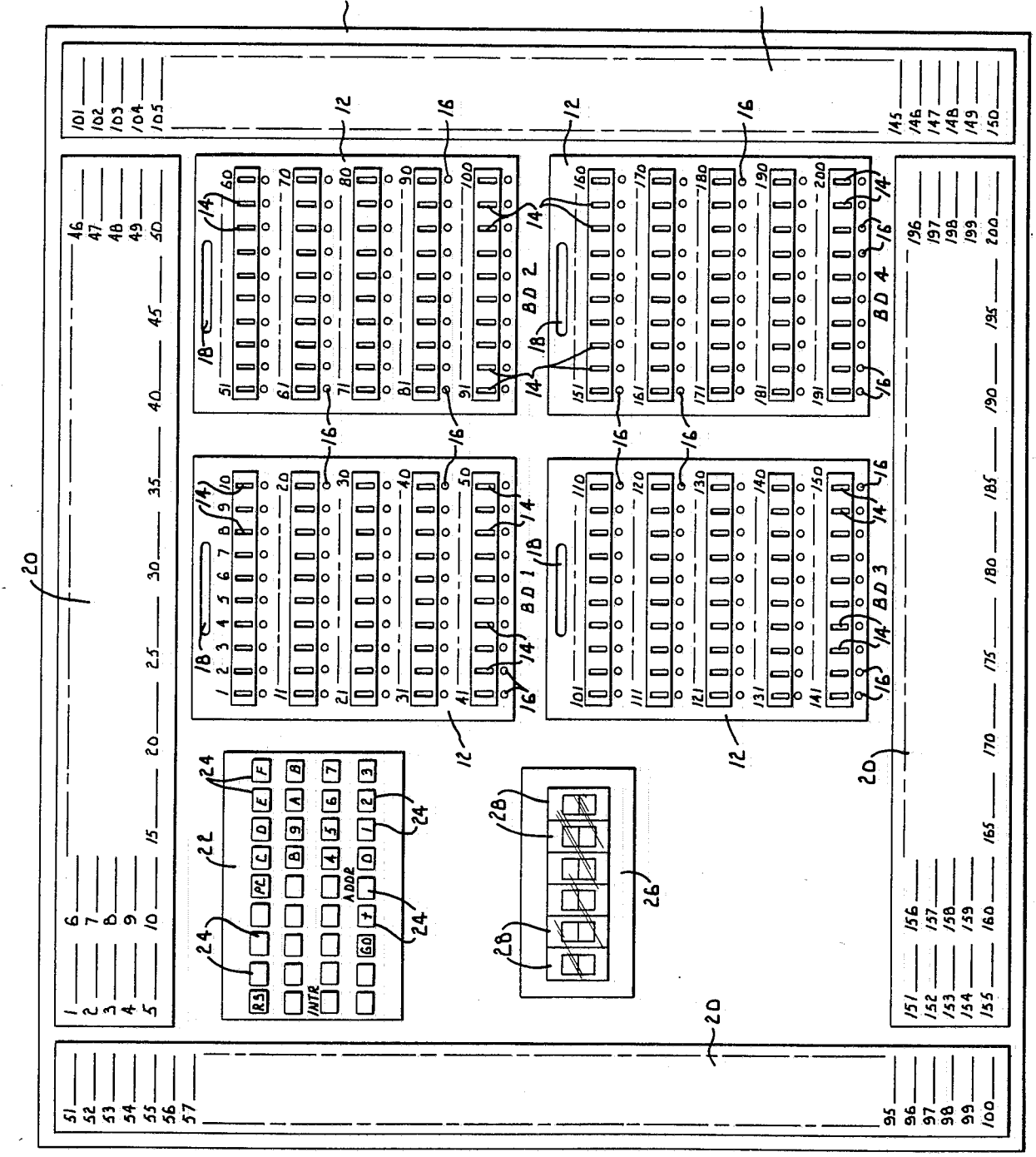
FIG. 1 is a front elevational view of a panel which holds keys in accordance with the key monitoring system of the present invention.

FIG. 1 illustrates a wall mounted panel 10 which holds the keys for the automobiles of a typical automobile dealership. The panel 10 is located at a convenient area in the dealership where salesmen and other authorized personnel have ready access to it, and it may be either wall mounted or free standing. Mounted on the front face of panel 10 are four detachable key holding panels 12 each having a plurality of edge connectors 14. The panels 12 are designated boards 1-4. The edge connectors on each panel 12 are arranged thereon in five rows each having ten edge connectors, although other arrangements are possible. The edge connectors on board 1 are assigned the numbers 1–50, those on board 2 the numbers 51–100, those on board 3 the numbers 101–150, and those on board 4 the numbers 151–200. Immediately below each edge connector 14 is a lamp 16 which serves as an indicator identifying the corresponding key, as will be explained more fully.

Each panel 12 is detachably connected to the main panel 10 by a conventional plug and socket arrangement (not shown) which physically holds panel 12 in place and at the same time electrically connects the edge connectors 14 and indicator lamps 16 with the control circuitry of the key monitoring system. Each panel 12 has a cutout 18 near its top edge which serves as a handle to facilitate carrying of the panel when it is detached from board 10.

Four elongate adhesive backed strips 20 are applied to the front face of the main panel 10 and extend generally along its four edges. Each strip 20 has numerals imprinted on it, and each numeral is associated with a blank space to which an adhesive backed label can be applied to provide a description of a vehicle to which the numeral corresponds. One of the strips 20 bears the numerals 1–50, another bears the numerals 51–100, the third bears the numerals 101–150, and the final strip bears the numerals 151–200. Each of the strips 20 can be used to designate one type of automobile such as the automobiles of a particular manufacturer or several manufacturers, used cars or new cars, or used cars having a given year of manufacture or range of years. The numerals on each strip can further be broken down into different groups, with each group corresponding to a particular automobile model name.

By way of example, the strip 20 which extends along the top edge of panel 10 can be designated for all new Chrysler automobiles, and this fact can be imprinted on the strip. Furthermore, the numerals 1–10 can be used to designate one particular model such as the Reliant model, and each Reliant automobile can be described in terms of its colors and features on the label which is applied to the blank space following the numeral which is assigned to the automobile. Then, a person attempting to locate the key for a particular automobile can locate the number corresponding to the automobile by locating its description on the proper strip 20.

The front surface of panel 10 is also provided with a conventional keyboard 22 having a plurality of keys 24 which correspond to letters, numerals and various command instructions. Located beneath the keyboard 22 on panel 10 is a visual display 26 which preferably includes six characters 28 each formed by a seven segment readout. The first four characters serve to display the key numbers and the last two characters are reserved for the display of user codes, as will be described in more detail.

Figure 2:
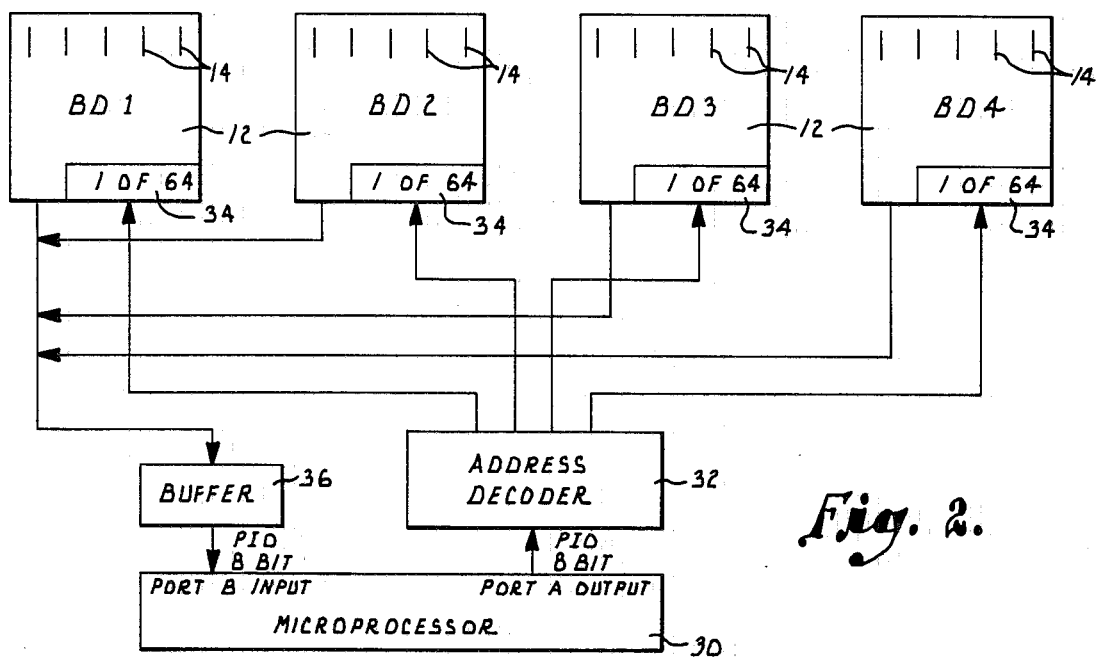
FIG. 2 is a block diagram of the key monitoring system.

Referring now more particularly to the block diagram of FIG. 2, the key monitoring system is controlled by a microprocessor 30 which acts to scan the edge connectors 14 of panels 12 to determine which key, if any, is applied to each edge connector. The microprocessor 30 has an output port connected with an address decoder block 32 which in turn connects with four 1 of 64 decoder blocks associated with the respective panels 12. Each edge connector 14 has a preselected address which is decoded by the address decoding circuitry. Information concerning the key located at each address is provided to the microprocessor 30 through a buffer block 36 which connects with an input port of the microprocessor.

Figure 3:
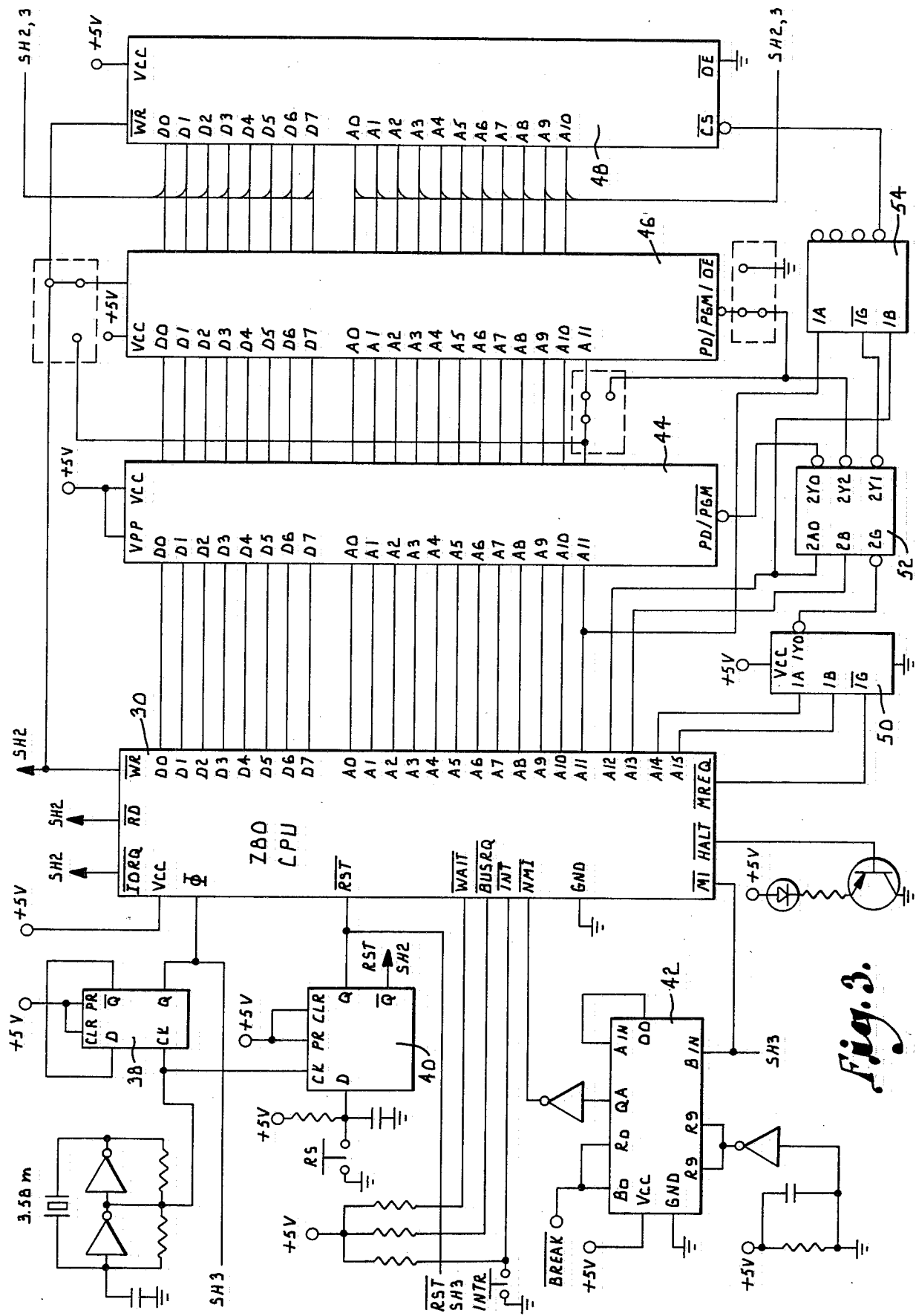
FIG. 3 is a schematic diagram of the microprocessor and related circuitry included in the key monitoring system.

Referring now to FIG. 3, the microprocessor 30 may take the form of a Z80 central processing unit connected with crystal driven flip flops 38 and 40 and a decode counter 42. Memories 44, 46 and 48 are interfaced with the microprocessor and controlled by decoders 50, 52 and 54 in conjunction with the $\overline{\text{MREQ}}$ (memory request) pin of the microprocessor. The circuitry associated with the microprocessor is in common usage and performs well known functions.

Figure 4:
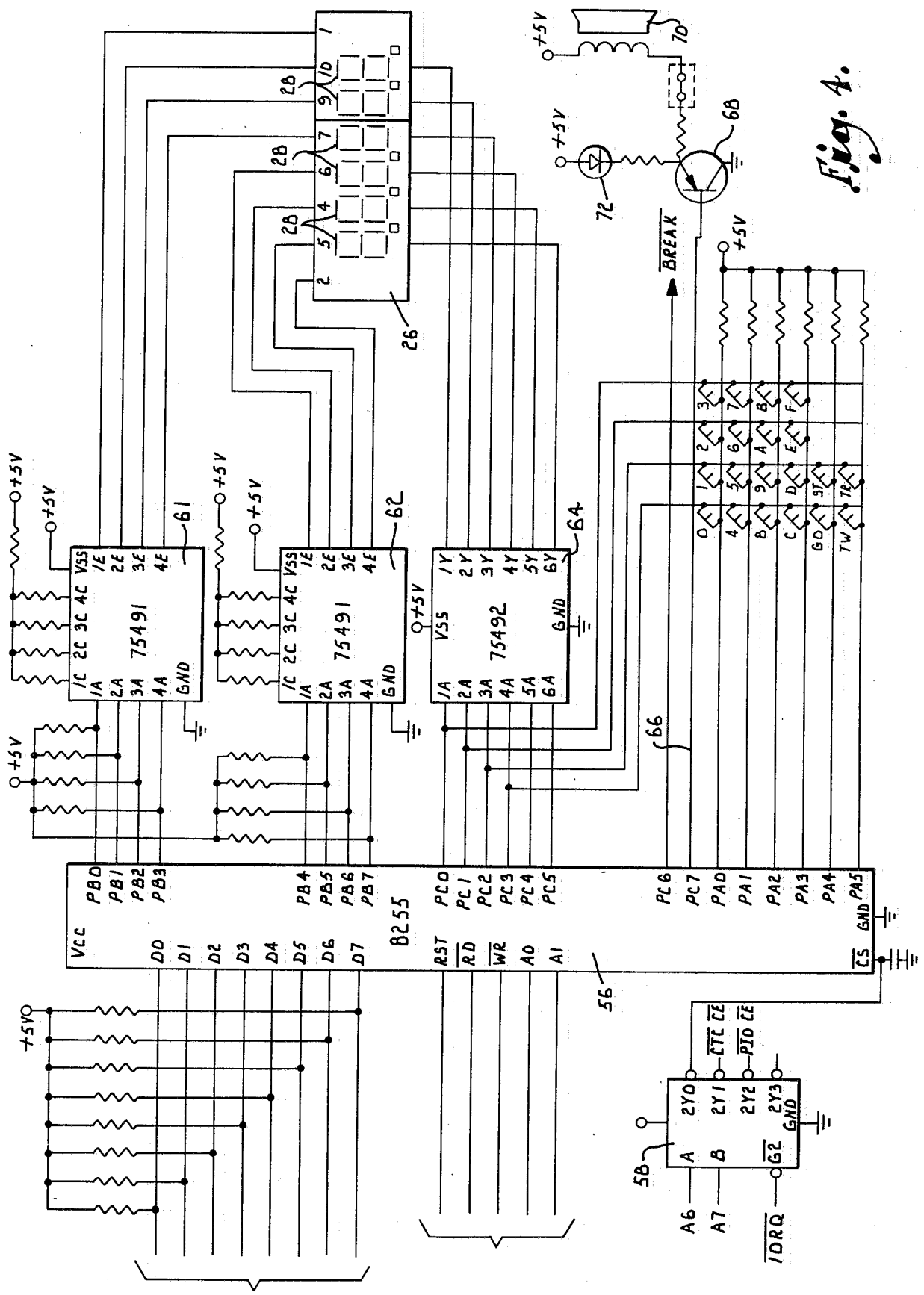
FIG. 4 is a schematic diagram of the visual display and related circuitry included in the key monitoring system.

FIG. 4 illustrates an Intel 8255 circuit chip 56 which is a commonly available programmable peripheral interface chip. The data bus connects with circuit 56, along with a decoder 58 which is enabled by the $\overline{\text{IORQ}}$ (input/output request) pin of the microprocessor. The output lines of circuit 56 connect with a pair of decoders 61 and 62 and a data selector 64 which control the digital display 26. The PC7 output line 66 from circuit 56 connects with the base of a pnp transistor 68 which controls a speaker circuit tied to its emitter. The collector is tied to ground. The speaker circuit includes a speaker 70 and an indicator LED 72 which are energized when transistor 68 is conductive.

Figure 5:
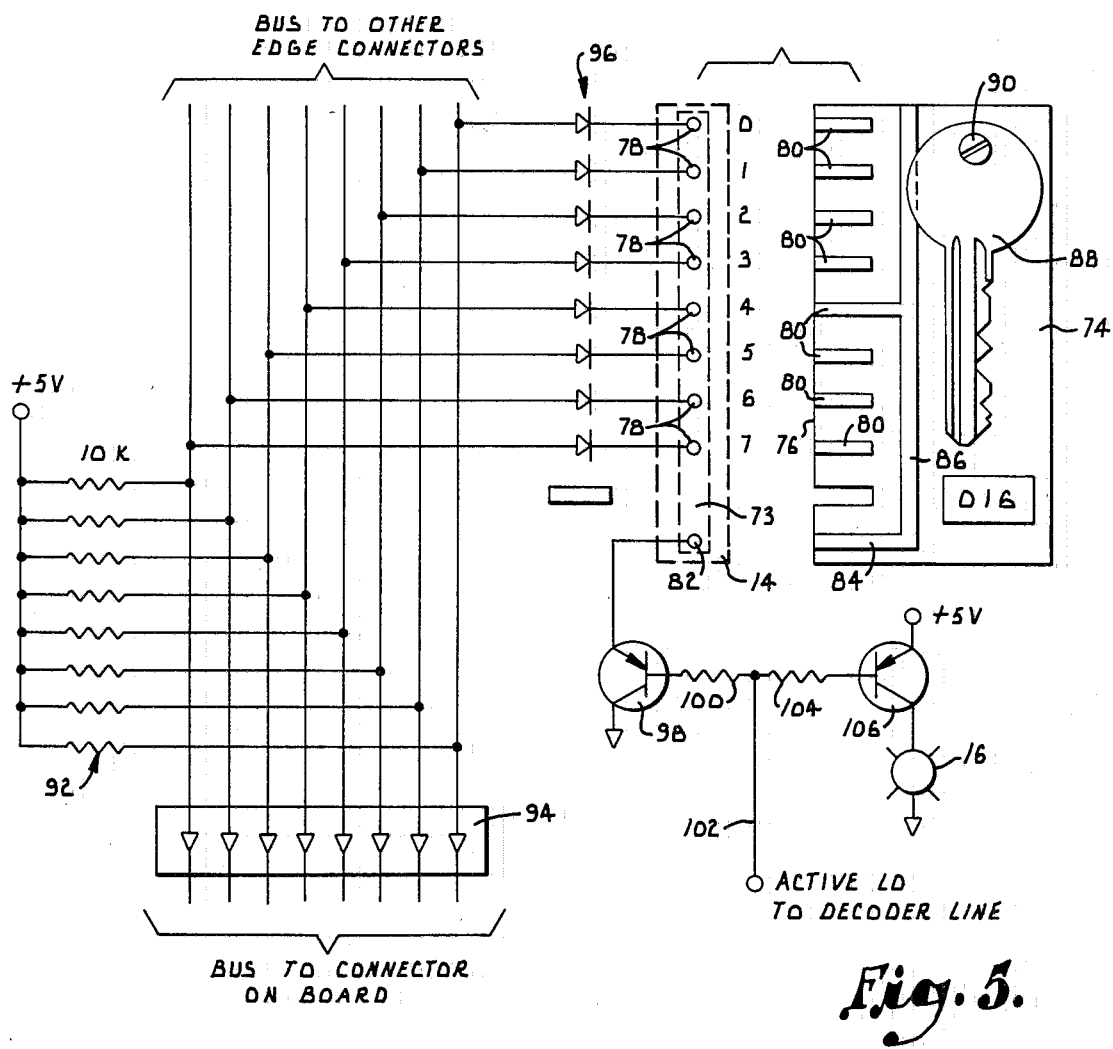
FIG. 5 is a schematic diagram of the edge connector and associated circuitry provided for each key which is monitored by the key monitoring system.

Referring now to FIG. 5, the edge connectors 14 have slots 73 which can receive rigid cards such as the card 74 which can have its edge 76 inserted into any edge connector. Within slot 73, each edge connector 14 has eight terminals 78 which line up with conductive metal strips 80 on the card. The strips 80 extend on card 74 from the edge 76 which is inserted in the edge connector. Another terminal 82 near one end of the edge connector is aligned with a final conductive strip 84 located near the corresponding end of the card. Strip 84 connects with a longitudinal conductive strip 86 on the card. Selected strips 80 likewise connect with strip 86 to provide each card 74 with a different binary identification code. For example, only the fifth strip 80 on the card shown in FIG. 5 (counted from the end opposite the end adjacent to strip 84) connects with strip 86, and all other strips 80 are disconnected from strip 86, giving the card the binaray code 10000 which is equivalent to the decimal number 16. Thus, the card corresponds to the decimal number 16 as indicated by the "016" designation imprinted on the card. The remaining cards 74 similarly binary coded to correspond to the remaining decimal numbers 1–200, or however many keys are to be monitored.

Each card 74 is provided with a key 88 which fits a particular automobile in the inventory of the dealership. Each key 88 is connected with its card for pivotal movement on a small screw 90 or other fastener. The key can pivot between the folded or storage position of FIG. 5 wherein it lies against the face of the card to permit the card to be applied to the edge connector, and an extended position wherein the key is offset by about 180° from the position of FIG. 5 such that it can be applied to the automobile ignition or door lock.

With continued reference to FIG. 5, the eight lines of the microprocessor data bus connect with each edge connector 14 on the panel 12 through the plug and socket connection which connects the panel 12 with the main panel 10. The data bus lines are biased to a high state by the application of +5 volts thereto through a bank of 10K pull up resistors 92. A data buffer 94 conditions the signals present on the lines of the data bus. The data bus lines connect through diodes 96 with the respective terminals 78 of each edge connector 14.

The final terminal 82 of each edge connector connects with the emitter of a pnp transistor 98 having its collector tied to ground and its base connected through resistor 100 with a decoder line 102 for the edge connector. Each edge connector has a different decoder line 102, and each decoder line is an active low line which is normally high but is placed in a low state when the corresponding edge connector 14 is addressed by the microprocessor. The decoder line 102 also connects through resistor 104 with the base of another pnp transistor 106. The emitter of transistor 106 is tied to +5 volts, and its collector is connected with system ground through the lamp 16 which is located immediately below the edge connector. The lamps 16 may conveniently be LEDS.

In use of the system, any number of binary coded cards 74 carrying different keys 88 may be applied to the various edge connectors 14 carried on the four detachable panels 12. Although the number of keys is limited to 200 for the panel 10 shown in FIG. 1, it is to be understood that larger or smaller numbers of keys may be accommodated by adding or subtracting key holding panels or edge connectors. It is contemplated that all keys which are not in use will be stored by installing their cards in the edge connectors 14. Each card 74 can be stored in any edge connector.

The electronic circuitry of the key monitoring system is powered by 115 volt, 60 Hz electrical power and by conventional power supplies operated from the available power. To activate the system, the RESET key (RS) on keyboard 22 is depressed. Under program control, the microprocessor then acts through the interface circuit 56 and the decoders 60 and 62 and the data selector 64 to cause the description "uPF--1" to appear on the six character visual display 26, indicating the microprocessor is waiting for additional instructions. The operating program is accessed at its storage address of 2000 by depressing the ADDRESS key (ADDR), entering the decimal number 2000 by sequentially depressing the 2 key and the 0 key three times, and then depressing the GO key on the keyboard 22.

This procedure accesses the stored program and causes the microprocessor to begin continuous scanning of all of the edge connectors. This scanning process is carried out at a rate of about 125 times per second, and it provides the microprocessor with continuously updated information as to the automobile keys which are at each addressable location on each key holding panel. The visual display 26 is blank in the scanning mode. During the scanning operation, the microprocessor sequentially addresses the edge connectors 14 and detects and stores in memory the identity of the card 74 which is inserted in the particular edge connector at each addressed location.

For example, it is assumed that the "016" or number sixteen key 88 shown in FIG. 5 is inserted in the edge connector 14 which corresponds to address 50. Each time address 50 is polled by the microprocessor, its decoder line 102 is placed in the active low state, thereby placing transistor 98 in a conductive condition. The card 74 inserted in the edge connector 14 establishes electrical contact between terminal 82 and strip 84 and also between the terminals 78 and the corresponding strips 80 on the card. Consequently, each data line is pulled to the low state only if the strip 80 corresponding to the data line connects with strip 86, and all other data lines are in the high state. Because only the fifth strip 80 connects with strip 86 for the "016" card shown in FIG. 5, only the fifth data line is pulled low and the binary code supplied by the card to the data bus informs the microprocessor that the key located at address 50 is key number 16.

All of the remaining addresses are scanned in a similar manner, and the scanning process informs the microprocessor as to which keys are at which addresses on the storage panel. The repeated scanning continuously updates the memory. Thus, if the "016" key is removed and the "125" key subsequently replaces it in the edge connector located at address 50, the next scanning operation so informs the microprocessor, and the memory is updated to reflect that automobile key number 125 is now at address 50. It is noted that the scanning operation senses the absence of a key at any address because terminal 82 remains disconnected from all of the terminals 78 and all lines of the data bus remain high.

Before the system can be used to locate keys, it is necessary that one or more user codes be entered. The user codes are two-character codes which identify authorized users of the system. For example, each automobile salesmen employed by the dealership may be assigned a particular user code such as A1, A2, A3 etc., and other authorized personnel such as the "lot man" and service manager may likewise be assigned individual user codes. It is contemplated that each code will have a letter as its first character and a number as its second character, although other patterns can be used. Each valid user code identifies a particular individual or group authorized to use the system.

The program routine requires that valid user codes be loaded into memory be depressing the RESET key (RS) and then the ADDRESS key (ADDR), entering the number 1811 (the address for the user codes), and then entering user codes in succession by depressing the appropriate alphanumeric keys 24 and the plus key (+) between each successive pair of codes. A maximum of 254 user codes can be loaded into the system, although provision can be made for accepting additional user codes if necessary. After all of the desired user codes have been entered, the end of the user code entry mode is marked by entering "00" or "10" on the keyboard 22. The system is returned to the address scanning mode by depression of the GO key, and all of the valid user codes are retained in memory.

Authorized users of the system can use it to locate desired keys by first determining the number that has been assigned to the desired key. For example, if a salesman wants to demonstrate a green Chrysler Horizon automobile in the new car inventory of the dealership, he can scan the strips 20 on the main panel 10 and determine that new Chrysler automobiles are described on the upper strip 20 which includes descriptions for all new Horizon models on the labels associated with the numerals 11-20. He can then scan these labels to determine that the numeral 16 has been assigned to the green Horizon automobile which is to be demonstrated.

To use the system, the salesman must first depress the INTERRUPT key (INTER), and the designation "USEr--" is then displayed on the visual display 26. The two-character user code that has been assigned to the salesman (A2, for example) is then entered on the keyboard 22. The microprocessor determines the validity of the user code, and if it is valid, the display 26 is changed to "C---A2" (with the last two characters A2 being the valid user code that has been entered). If the user code is invalid, the PC7 line 66 (see FIG. 4) is activated, and the speaker 70 generates a warning sound which is accompanied by a warning indication generated by LED 72. The USEr-- display returns, and a valid code can then be entered.

After a valid user code has been entered, the user should enter on keyboard 22 the number 016 which he has determined is the identification number of the key to be located. When the identification number has been entered and the GO key is subsequently depressed, the microprocessor extracts from memory the address of the 016 key (if it is present on the panel) and places the decoder line 102 for such address in the active low state. Thus, if the 016 key is at address 50, the decoder line 102 for address 50 goes low. This makes transistor 106 conductive and energizes the lamp 16 located immediately below the edge connector identified by numeral 50 on the first panel 12. This indicates visually the location of the desired key, and it can be removed and used by the salesman or other authorized user of the system. When the key is removed, information that key number 16 has been removed by the user identified by user code A2 is entered into memory. The system is returned to the scan mode by depression of the GO key, and the energized lamp 16 is extinguished.

If another salesman subsequently enters his valid user code (A3, for example) and enters the number 016 on the keyboard to request the location of key number 16 before it has been returned by salesman A2, none of the indicator lamps 16 will be energized because key number 16 is absent. However, the microprocessor extracts from memory the user code of the user who removed it and displays the designation "C016A2", indicating that key number 16 was removed by the person assigned user code A2. This tells the second salesman that the first salesman (A2) is in possession of the key, and he can obtain it from the first salesman who may be finished with the key but may have failed to return it. In this manner, information is given identifying the location of missing keys.

Any key can be applied to any edge connector when returned to the main storage panel. Thus, the salesman who removed key number 16 from address 50 need not return it to address 50 and can return it to any vacant edge connector such as that corresponding to address 61. When the key is returned, its new address is immediately detected during the scanning process, and the user code of the user who removed it is cleared from memory and its new address is entered into memory. The returned key is thereafter available to subsequent users.

If a key number is made the subject of a valid request and the key is missing without a record of the identity of the borrower in memory (such as when the key is removed while the system is not operating), the display 26 provides a display which indicates the requested key number followed by the designation "00" in the last two digits of the display. This informs the person seeking the key that it has been removed in an unauthorized manner, and proper measures can be taken if necessary. A key which is removed without a valid user code and the key number having first been entered results in the activation of line 66 and a warning sound emitted from speaker 70 accompanied by a warning signal given by LED 72.

Thus, a proper request mode for the location of a key results in: (1) energization of the adjacent lamp 16 if the key is present; (2) a display identifying the person in possession of the key if it has been removed in an authorized manner; or (3) a display indicating that the key has been removed in an unauthorized manner. The monitoring system operates in the foregoing manner to monitor the location of all keys and to inform authorized personnel of the key location. Consequently, the system greatly reduces the problem of keeping track of keys in automobile dealerships, parking lots, rental car companies, real estate companies, factories, office buildings, apartment buildings and other businesses in which large numbers of keys are handled by numerous persons. In addition to keys, other articles can be mounted on the coded cards 74, and such other articles can be monitored in the manner previously described.

In the case of an automobile dealership, it is normal practice for the "lot man" to lock all automobiles in the lot at closing time in the evening and to unlock them the next morning. To accomplish this, the "lot man" can detach all of the panels 12 from the main panel 10 and carry then with him to the lot. He can lock the automobiles and put the keys for adjacent vehicles in adjacent edge connectors. Then, the next morning, the keys for adjacent vehicles will be in adjacent edge connectors, and the work of the "lot man" is thereby greatly facilitated by the ability to detach panels 12 from the main panel and by the ability of all keys to be applied to any of the edge connectors. A push button or other switch can be provided and the microprocessor can be programmed such that when the switch is activated, the numbers of all keys that are missing from the storage panel are displayed sequentially, accompanined by the user codes identifying those in possession of the keys. This allows management to locate salesmen and other personnel and to keep track of their whereabouts. Additionally, a conventional printer can be provided to print on command the numbers of all keys that have been removed over a given period (such as a week or a month), the identities of those who removed each key, and the length of time each key was in the possession of each authorized user. A conventional timer can be supplied to record the time and day each key is removed and returned so that management can determine which salesmen are demonstrating which automobiles and how long and how often they are doing so.

It is to be understood that article holders other than the cards 74 can be used and that the coding for each key can be effected other than by the conductive strips 80, 84 and 86. Also, the key holders may be locked in place on the storage panel and released so that they can be removed only after a valid user code and the proper identification code have been entered.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Apparatus for storing and monitoring the locations of articles such as keys, said apparatus comprising:

a plurality of article holders each holding one article and each having a unique identification code which identifies the article held thereby;

a storage member having a plurality of fixed and stationary storage locations for the articles, each storage location having a unique address and being adapted to receive and store one article holder at a time, each article holder being removable from the storage location at which it is stored and each article holder being replaceable on the storage member at any randomly selected storage location which is not already storing another of the article holders;

an indicator for each storage location on said storage member, each indicator having energized and deenergized conditions;

means for scanning all of said addresses periodically to determine and periodically update for each address the identification code of the article holder stored at the storage location corresponding to the address;

means for accepting and recording valid user codes assigned to authorized users;

means for accepting coded requests each requesting the storage location of an article holder, each request corresponding to the indentification code of the article holder whose storage location is requested;

means for energizing the indicator for the storage location of each article holder whose identification code corresponds to a coded request, thereby indicating the location of the article holder to which each coded request corresponds;

means for recording the identification code of each article holder that is removed from said storage member; and means for displaying the user code and the identification code of each removed article holder, thereby identifying the user code of the user who removed each article holder that has been removed from said storage member.

2. Apparatus as set forth in claim 1, including means for providing a warning signal in response to an invalid user code.

3. Apparatus as set forth in claim 1, wherein said display means is operable only after a valid user code has been accepted and a coded request has been accepted corresponding to the identification code of an article holder removed from said storage member.

4. Apparatus as set forth in claim 1, including means for displaying the identification code of each removed article holder and an indication that same was removed without a valid user code having been accepted.

5. Apparatus as set forth in claim 1, including means for displaying each valid user code that is accepted.

6. Apparatus as set forth in claim 1, including means for providing a warning signal when any article holder is removed from said storage member without prior acceptance of a valid user code.

7. Apparatus as set forth in claim 1, including a plurality of removable panels on said storage member, said storage locations being presented on said removable panels.

8. Key storage apparatus for storing a plurality of keys and monitoring the keys, said apparatus comprising:

a plurality of key holders each holding one of the keys, each key holder having a unique identification code which identifies the key held by the holder and distinguishes the key from other keys;

a key storage panel having a storage surface presenting thereon a plurality of discrete storage locations each having a unique address, each storage location being fixed and stationary;

means at each of said discrete storage locations for receiving and storing one key holder at a time, each key holder being removable from the storage location at which it is stored and each key holder being replaceable on the storage panel at any randomly selected storage location which is not already storing another of the key holders, whereby the key holders can be stored at said discrete locations in random order;

an indicator light situated at each discrete storage location on said key storage panel, each light having an energized condition and a deenergized condition;

means for scanning all of said addresses periodially to determine and periodically update the identification code of the key holder stored at the location corresponding to each address;

means for accepting valid user codes assigned to authorized personnel and rejecting invalid user codes;

means for accepting coded requests corresponding to the identification codes of the key holders only after a valid user code has been accepted, each coded request requesting the storage location of the key holder having the identification code to which the coded request corresponds;

means for energizing each light in response to acceptance of a coded request corresponding to the identification code of the key holder stored at the storage location of the light, whereby energization of a light indicates the storage location of the key holder whose identification code corresponds to an accepted coded request;

means for recording the identification code of each key holder that is removed from said storage panel; and means for displaying the user code and the identification code for each removed key holder, thereby identifying the user code of the user who removed each key holder that has been removed from said storage panel.

9. Apparatus as set forth in claim 8, wherein:

each key holder includes a card carrying said identification code thereon adjacent one edge of the card; and said means for receiving and storing includes an edge connector adapted to receive said one edge of each card, each edge connector having means for sensing the identification code on the card inserted therein.

10. Apparatus as set forth in claim 8, including a pluralty of removable panels on said storage surface of the storage panel, each of said removable panels having a preselected number of said discrete locations thereon.

11. Apparatus as set forth in claim 8, wherein each key relates to a different object and including:

an orderly printed list of the identification codes of the key holders on said storage surface of the storage panel; and a description of the ojbect to which each key relates, each description being located on said storage surface adjacent the corresponding identification code.

12. Apparatus as set forth in claim 8, including means for displaying the identification code of each removed key holder and a preselected code indicating that no valid user code was accepted prior to removal of the key holder.

13. A method of storing and monitoring the locations of articles such as keys, said method comprising the steps of:

providing a storage panel having a plurality of discrete addresses at which the articles may be stored;

storing articles on the storage panel at the discrete addresses in stationary positions;

assigning to each article a unique identification code;

scanning all of the addresses periodically to determine and periodically update the identification code of the article stored at each address;

assigning a unique user code to each user authorized to remove articles from said storage panel;

accepting valid user codes and rejecting invalid user codes;

accepting coded requests which request the addresses at which the articles are stored and which correspond to the identification codes, said coded requests being accepted only after a valid user code has first been accepted;

providing a visual indication at the address on the storage panel at which an article is stored whose identificatian code corresponds to a coded request that has been accepted;

displaying the identification code of each article that has been removed from the panel and the user code accepted at the time of its removal when a coded request is accepted corresponding to the identification code of an article that has been removed following acceptance of a valid user code; and displaying the identification code of each article that has been removed from the panel and a preselected code when a coded request is accepted corresponding to the identification code of an article that has been removed without prior acceptance of a valid user code.

* * * * *